Figure 1:
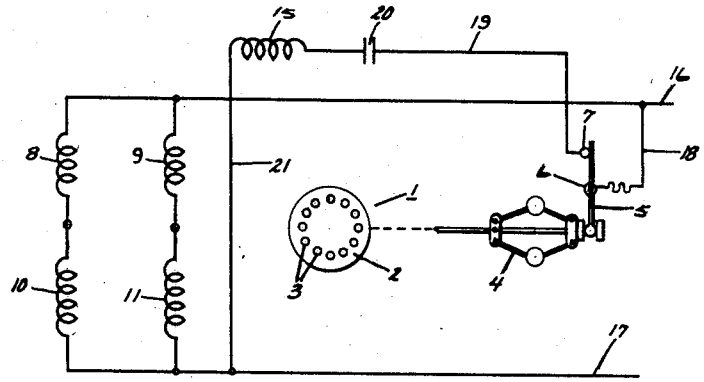

Nov. 11, 1958  L. MOLLENBERG  2,860,296

DUAL-VOLTAGE ALTERNATING-CURRENT MOTOR

Filed Nov. 20, 1957

Inventor:
Leroy Mollenberg,
by
Attorney.

United States Patent Office 2,860,296
Patented Nov. 11, 1958

2,860,296

DUAL-VOLTAGE ALTERNATING-CURRENT MOTOR

Leroy Mollenberg, Fort Wayne, Ind., assignor to General Electric Company, a corporation of New York Application November 20, 1957, Serial No. 697,558

3 Claims. (Cl. 318—221)

This invention relates to dynamoelectric machines, and more particularly to an improved dual-voltage single-phase alternating-current induction-type motor.

There is a considerable number of applications where it is a prerequisite that a single-phase alternating-current electric motor be capable of operating on two different voltages such as, for instance, 115 volts and 230 volts. A well known way of achieving a dual voltage motor is to provide a main winding made up of two equal parts which are connected in parallel at the lower voltage and in series at the higher voltage. Such motors are normally provided with a starting winding which is in actual and phasic displacement from the main winding so as to cooperate therewith to provide a starting torque. The starting winding is normally connected in parallel with both parts of the main winding at the lower voltage. In the past, to provide a comparable starting torque at the higher voltage, it has been customary to connect the starting winding in series with one part of the main winding and in parallel with the other part thereof. This connection has had the effect, however, of decreasing the voltage and the current through the main winding part in parallel with the starting winding, thus creating an overall decrease in the starting torque. In addition, primarily because of the differences in the amount of current and in the phase of the current in the two parts of the main winding, spatial harmonics occur in the air gap magnetomotive force which have seriously affected the torque curve as the motor comes up to speed. To avoid these effects, it has in the past usually been found necessary to provide an extra main winding which would lie in all the same slots of the motor stator as the first main winding so that at the higher voltage the starting winding could be connected across one entire main winding and in parallel with one entire main winding. While such an arrangement achieves the desired effect of minimizing the poor starting characteristics, it increases the cost of the motor substantially over that of a motor having a main winding which only has one coil in each slot it occupies. Thus, in the past, it has been found necessary to select one of two alternatives: either an extra main winding is added thereby substantially increasing the cost; or the single main winding described above is used together with its undesirable torque features but with its economy as compared to the first alternative. It is most desirable to provide a motor which will have performance characteristics approaching those of the first alternative while having economical features which approach those of the second alternative.

It is, therefore, an object of this invention to provide an improved dual-voltage single-phase alternating-current induction-type motor which will provide a suitably high starting torque without the expense which has heretofore been associated with high-starting-torque dual-voltage motors.

In one aspect thereof, the invention provides a dual-voltage single-phase alternating-current induction-type motor whose stator has a main winding made up of four sections; the first two sections each have a first predetermined number of coils while the second two sections each have a second and greater predetermined number of coils. The first two sections are formed into a first group of poles of like polarity which are distributed around the stator, as is well known in the art, and the second two sections are formed into a second group of poles of polarity opposite to the first mentioned poles which are distributed around the stator alternately with the poles of the first group. When the motor is operated at a first lower voltage the sections are connected in two parallel groupings with each grouping consisting of one of the first sections and one of the second sections in series. When the motor is operated at a second and higher voltage the sections are connected in series. A starting winding is displaced from the main winding both physically and in phase by a capacitor which is connected in series with it. The starting winding and the capacitor are connected in parallel with both groupings during starting at the lower voltage. However, at the higher voltage, the starting winding and the capacitor are connected in series with the first two sections but in parallel with the second two sections. This in effect puts the starting winding across substantially more than half of the total number of coils of the main winding and thereby increases the voltage (and consequently the current) across the starting winding and across that much of the main winding with which it is in parallel.

The increase in current through the starting winding and that portion of the main winding in parallel therewith raises the torque during the starting period. In addition, the fact that substantially more than half of the main winding is connected across the starting winding means that there will be a smaller remaining number of main winding turns which have a different current (as to amount and as to phase). This decreases to some extent the spatial harmonics which previously contributed to the undesirability of a main winding having only one coil in each slot it occupies. It also makes such a connection, with its economical features, possible where high torque performance is a prerequisite.

The features of the invention which are believed to be novel are set forth with particularity in the appended claims. The invention itself, however, both as to its organization and method of operation, together with further objects and advantages thereof, may best be understood by reference to the following description taken in connection with the accompanying drawing.

Figure 2:
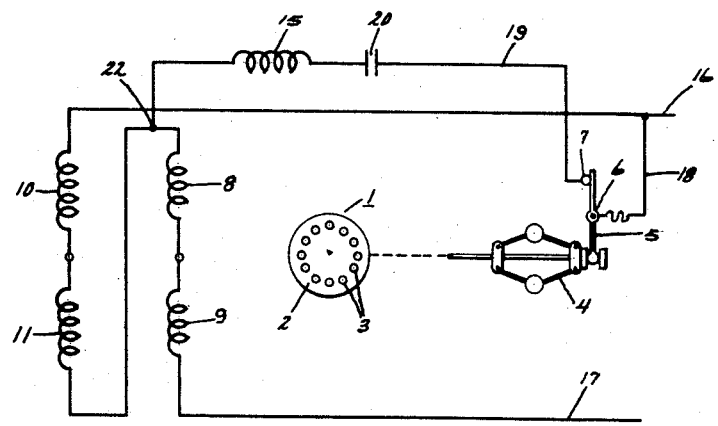
Figure 3:
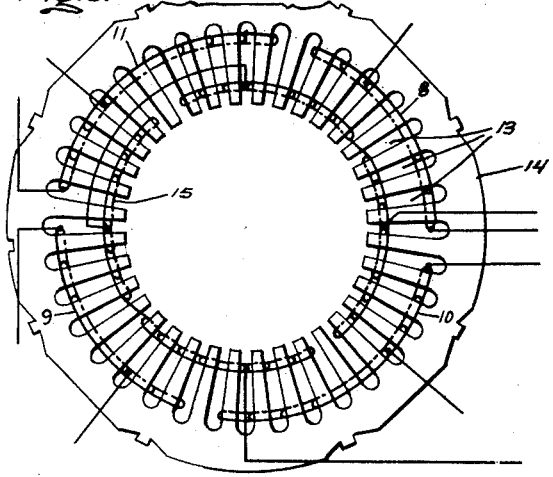

In the drawing, Figure 1 is a schematic diagram of the improved motor of this invention connected for operation at the lower voltage;

Figure 2 is a schematic diagram of the motor connected for operation at the higher voltage; and Figure 3 is an end view of a stator showing the physical disposition of the windings on the stator.

Referring now to Figure 1 of the drawing, there is shown a single-phase alternating-current motor 1 of the induction type having a rotor 2 with squirrel cage conductors 3 extending therethrough and short circuited together at each end (not shown). Rotor 2 operates a centrifugal mechanism 4 which includes a contact arm 5 pivoted at 6. When rotor 2 is at rest, or is rotating below a predetermined speed, contact arm 5 is in the position shown so that it is in engagement with a contact 7; above the predetermined speed, centrifugal mechanism 4 will make contact arm 5 pivot about point 6 to separate from contact 7. Motor 1 has a main field winding which is made up of four sections 8, 9, 10 and 11 wound in the slots 13 of stator 14 to provide poles of alternately opposite polarity. It will be observed that sections 8 and 9 have the same number of coils and that sections 10 and 11 have the same number of coils, with the latter two sections having a greater number of coils than the first two sections. Also, all the poles of one polarity are provided by sections 8 and 9 while the opposite poles which are positioned between them are all provided by the second pair of sections 10 and 11. A starting winding 15 is wound on all poles in the usual manner.

Motor 1 is adapted to be connected across a source of single-phase alternating-current power (not shown) by means of lines 16 and 17 with the low-voltage connection of Figure 1, winding sections 8 and 10 are in series with each other in a first grouping across lines 16 and 17, and winding sections 9 and 11 are in series with each other in a second grouping across lines 16 and 17 but in parallel with sections 8 and 10. It will be observed that the sections have been distributed so that the same number of coils are provided in each grouping so as to prevent circulation of current between the two groupings. At this low voltage connection, starting winding 15 is connected to line 16 through a line 18, contact arm 5, contact 7, and a line 19 which includes a capacitor 20. The other end of starting winding 15 is connected to line 17 by a line 21. In this manner, the starting winding is arranged across the source in parallel with both groupings of main winding sections.

For operation across a high voltage (such as 230 volts) alternating-current source of power (not shown), motor 1 is connected as shown in Figure 2. In this case, winding sections 8, 9, 10, and 11 are all connected in series with each other across lines 16 and 17. However, it will be seen that the two sections 10 and 11 which have the higher number of coils are next to each other and that starting winding 15 is now connected to the main winding between sections 11 and 8 at point 22. This effectively places the starting winding 15 across sections 10 and 11 and in series with sections 8 and 9. With this high voltage connection it is readily apparent that the starting winding 15 is across substantially more than half the main winding coils since each of the sections 10 and 11 has more coils than each of the sections 8 and 9. With this arrangement, the voltage across winding 15 is the sum of the voltages across sections 10 and 11 and is substantially more than would be the case where, as has previously been provided, the main winding was made up of equal sections with the starting winding connected to the mid-point of the main winding for high voltage starting. The current through winding 15 and through main winding sections 10 and 11 is raised as a result. Also, the fact that substantially more than half of the main winding has current at a single phase reduces to a considerable degree the spatial harmonics previously present.

It will be seen from the foregoing that the broad concept of the invention lies in the provision, in a dual-voltage motor, of a main winding having two pairs of sections with each section of one pair having a larger number of coils than each section of the other pair. The starting winding of the motor is in parallel with two equal groupings of main winding sections for low voltage starting, but for high voltage starting the starting winding is placed in parallel with those main winding sections which have the higher number of coils.

It will be understood that as the extent to which the number of coils in sections 10 and 11 exceeds the number of coils in sections 8 and 9, the voltage across the capacitor increases and the minimum torque during starting increases. Thus, the starting torque may be increased by the simple expedient of increasing the differential. However, tests have shown that consideration of the other operating factors of the motor makes a differential of one coil between the poles formed from like sections 8 and 9 and the poles formed from like sections 10 and 11 of the preferred construction.

While the invention has been explained by describing a particular embodiment thereof, it will be apparent that improvements and modifications may be made without departing from the scope of the invention as defined in the appended claims.

What I claim as new and desire to secure by Letters Patent of the United States is:

1. A dual-voltage single-phase alternating-current induction-type motor having a stator including a main winding comprising four sections, the first two of said sections each having a first predetermined number of coils, the second two of said sections each having a second greater predetermined number of coils, said first two sections being formed into a first group of poles of like polarity distributed around said stator, said second two sections being formed into a second group of poles of opposite polarity distributed around said stator alternately with the poles of said first group, said sections being connected in two parallel groupings for operation at a first lower voltage, each grouping consisting of one of said first sections and one of said second sections in series, said sections being connected in series for operation at a second higher voltage, a starting winding displaced from said main winding, and a capacitor connected in series with said starting winding, said starting winding and said capacitor being connected in parallel with both said groupings during starting at the lower voltage, said starting winding and said capacitor being connected in series with said first two sections and in parallel with said second two sections during starting at the higher voltage.

2. A dual-voltage single-phase alternating-current induction-type motor having a stator including a main winding comprising four sections, the first two of said sections each having a first predetermined number of coils, the second two of said sections each having a second greater predetermined number of coils, said first two sections being formed into a first group of poles of like polarity distributed around said stator, said second two sections being formed into a second group of poles of opposite polarity distributed around said stator alternately with the poles of said first group, each pole of said second group having one more coil than each pole of said first group, said sections being connected in two parallel groupings for operation at a first lower voltage, each grouping consisting of one of said first sections and one of said second sections in series, said sections being connected in series for operation at a second higher voltage, a starting winding displaced from said main winding, and a capacitor connected in series with said starting winding, said starting winding and said capacitor being connected in parallel with both said groupings during starting at the lower voltage, said starting winding and said capacitor being connected in series with said first two sections and in parallel with said second two sections during starting at the higher voltage.

3. A dual-voltage single-phase alternating-current induction-type motor having a stator including a main winding comprising four sections, the first two of said sections each having a first predetermined number of coils, the second two of said sections each having a second greater predetermined number of coils, said first two sections being formed into a first group of poles of like polarity distributed around said stator, said second two sections being formed into a second group of poles of opposite polarity distributed around said stator alternately with the poles of said first group, said sections being connected in two parallel groupings for operation at a first lower voltage, each grouping consisting of one of said first sections and one of said second sections in series, said sections being connected in series for operation at a second higher voltage, a starting winding displaced on said stator from said main winding, said starting winding being connected in parallel with both said groupings during starting at the lower voltage, said starting winding being connected in series with said first two sections and in parallel with said second two sections during starting at the higher voltage.

No references cited.